United States Patent
Moore et al.

(10) Patent No.: US 7,383,581 B1
(45) Date of Patent: Jun. 3, 2008

(54) IDENTIFYING MALWARE CONTAINING COMPUTER FILES USING EMBEDDED TEXT

(75) Inventors: Robert Edward Moore, Aylesbury (GB); Fraser Peter Howard, Chipping Norton (GB); Lee Codel Tarbotton, Leicester (GB)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 11/449,942

(22) Filed: Jun. 8, 2006

Related U.S. Application Data (63) Continuation of application No. 10/025,541, filed on Dec. 26, 2001, now Pat. No. 7,114,185.

(51) Int. Cl.
*G06F 21/00* (2006.01)
(52) U.S. Cl. .................................. 726/24
(58) Field of Classification Search ............ 726/24
See application file for complete search history.

(56) References Cited

U.S. PATENT DOCUMENTS

| | | | | |
|---|---|---|---|---|
| 5,960,170 A | * | 9/1999 | Chen et al. | 714/38 |
| 6,009,429 A | * | 12/1999 | Greer et al. | 707/10 |
| 6,357,008 B1 | * | 3/2002 | Nachenberg | 726/24 |
| 2003/0097591 A1 | * | 5/2003 | Pham et al. | 713/201 |

* cited by examiner

*Primary Examiner*—Gilberto Barrón, Jr.
*Assistant Examiner*—Cordelia Kane
(74) *Attorney, Agent, or Firm*—Zilka-Kotab, PC; Christopher J. Hamaty (57) ABSTRACT

A computer file may be scanned for suspicious words 18 occurring within suspicious contexts 20. Thus, messages embedded by malware authors within their malware may be detected. The detection of such embedded messages may be used to identify otherwise unknown items of malware or as a pre-filtering technique for controlling the use of further scanning techniques.

21 Claims, 5 Drawing Sheets

IDENTIFYING MALWARE CONTAINING COMPUTER FILES USING EMBEDDED TEXT

This is a Continuation application of prior application Ser. No. 10,025,541 filed on Dec. 26, 2001, now U.S. Pat. No. 7,114,185 the disclosure of which is incorporated herein by reference.

BACKGROUND OF THE INVENTION

1. Field of the Invention

This invention relates to the field of data processing systems. More particularly, this invention relates to the field of identifying computer files containing malware, such as, for example, computer viruses, worms, Trojans and the like.

2. Description of the Prior Art

It is known to provide malware identifying mechanisms that search computer files for sequences of computer instructions that are characteristic of particular items of malware, e.g. virus signatures comprising particular sequences of opcodes at particular locations within a computer file. It is also known to provide malware scanning systems that utilise a heuristic approach to identifying malware whereby the computer code is analysed to identify the type of actions it will perform and suspicious actions are recognised. If sufficient suspicious activity is identified, then the computer file will be treated as if it contains malware.

Searching for virus signatures has the disadvantage that the viruses must be already known to the system in that the appropriate virus signature must have already been generated and distributed. Thus, this virus protection is always one step behind the virus writers and there will be a finite period of time between release of a new virus and the virus signatures becoming available during which virus signature detection will not be effective for the newly released virus.

Heuristic detection techniques can be more effective for new viruses in that new viruses can be detected even though they have not previously been encountered since they will display suspicious activity that can be identified by heuristic analysis. However, a significant disadvantage of heuristic scanning is that it requires a considerable amount of data processing resource to perform which disadvantageously slows the malware scanning operation. Furthermore, as new types of suspicious activity are discovered, it is a complicated and expensive task to develop new heuristic analysis tools to detect such suspicious actions.

Measures which can improve the ability to detect malware whilst avoiding an excessive increase in the amount of required processing resource are strongly advantageous.

SUMMARY OF THE INVENTION

Viewed from one aspect the present invention provides a computer program product operable for controlling a computer to identify a computer file as potentially containing malware, said computer program product comprising:

searching code operable to search within said computer file for text data containing one or more target words that match at least one of a word or a characteristic of a word within a predetermined word library;

context identifying code operable to identify a context within said computer file of said one or more target words; and file identifying code operable if said context matches one or a predetermined set of contexts to identify said computer file as potentially containing malware.

The present invention recognises that the psychology of malware authors is such that they often embed their signature, e.g. in the form of a pseudonym, or messages to other malware authors within their malware. In this way a malware author may seek to demonstrate their authorship a new piece of malware and communicate with other malware authors. Identifying such embedded text within a computer file can provide a mechanism for detecting malware even if the malware executable code itself has not previously been encountered. In particular, analysis of the names and messages embedded by malware authors within their malware indicates that there are certain words, such as known malware pseudonyms, malware writing slang and the like that if encountered within a particular context are highly indicative of the computer file concerned containing malware. Identifying predetermined words within predetermined contexts is significant in that whilst the identification of a malware author pseudonym within a word processed document that happened to deal with the subject of malware would not be significant, identifying the same pseudonym embedded within an executable file or within a script portion of a web page would be highly significant. Identifying particular words within particular context makes the technique sensitive enough to identify a worthwhile number of computer files infected with malware that would otherwise be missed and yet sufficiently specific so as not to cause an unacceptable degree of false alarms. In this way a new item of malware may be identified even though a virus signature does not yet exist and without having to utilise heuristic analysis by instead identifying suspicious words or messages embedded in a computer file in an appropriate context.

It will be appreciated that the words that may be searched for within a computer file and that are indicative of malware could take a wide variety of forms. One clear target would be to search for names associated with known malware authors. In common with many other fields, malware writing has it's own associated jargon/slang and the presence of such words (or phonetically equivalent words, e.g. cracks=krakz) within a computer file is again indicative of that computer file containing malware. Another characteristic of messages embedded by malware authors is that they often utilise particular formatting characteristics, such as unusual mixes of upper and lower case characters within a single word. Other characteristics of words that may be looked for are particular forms of suffixes to words, e.g. it is common for messages within malware to contain words that would normally end in "s" to instead be spelt in a form ending with "z". Further characteristics that may be searched for are the use of phonetic spellings of particular words as this is often characteristic of a malware author message within the particular subculture involved.

As previously mentioned, the technique is also sensitive to the context within which a particular target word is identified. This significantly increases the reliability of the technique. Preferred examples of context within which the occurrence the target word is deemed suspicious are within the script portion of a web page, within a comment of a web page, within executable code and within a certain proximity of another target word or a particular other word that in itself is not suspicious.

It will be appreciated that the present technique of searching for messages using target words and contexts could operate in a wide variety of ways in addition to those mentioned above. Such different implementations are encompassed within the technique of the present invention.

In preferred embodiments of the invention, when the computer file is identified as potentially containing malware, then one or more malware found actions may be triggered.

Preferred forms of malware found action include blocking access to the computer file concerned, deleting the computer file concerned, issuing warning messages to a user or system administrator, reporting the computer file to a malware scanner provider, deleting a portion of the computer file concerned and the like.

The present technique may be particularly advantageously combined with other malware scanning techniques as a way of rapidly pre-scanning a computer file to determine whether it is suspicious and then using this determination to control a threshold level associated with a further malware scanning technique, e.g. a computer file that is identified as containing a potentially suspicious message may then be subject to heuristic scanning even though it was not file type that would otherwise be so scanned in the default system set up. This allows the system to adjust the thoroughness of the scanning applied in such a way that more processing resource is allocated to this potentially suspicious computer file than would normally be allocated.

This approach is particularly advantageous and useful when the prescanning for embedded messages is used to control a threshold level for subsequent heuristic scanning. In this way the effectiveness of heuristic scanning maybe improved.

In some embodiments of the invention an entire computer file may be searched for target words as this will provide thorough coverage. As an alternative, only those portions matching certain contexts within a computer file may be searched for target words in an effort to reduce the scanning overhead.

It will be appreciated that the current technique could be used to identify a wide variety of different types of malware, but it is particularly effective in detecting computer viruses, worms and Trojans as the authors of such malware tend to embed characteristic messages within their malware.

Viewed from third aspect the present invention also provides a method of identifying computer files containing malware an apparatus for identifying computer files containing malware.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
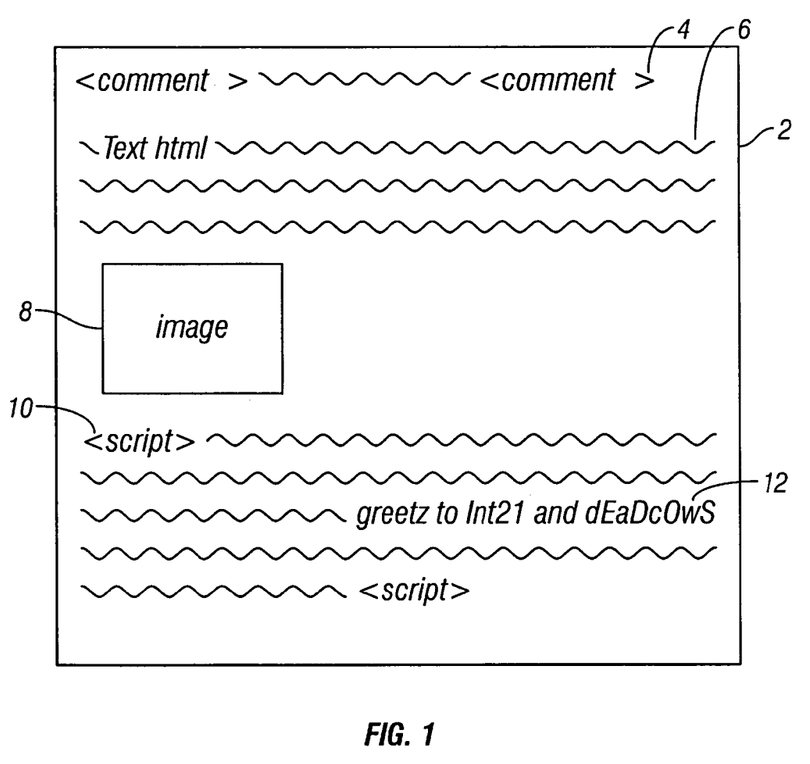
FIG. 1 schematically illustrates a web page containing embedded malware.

FIG. 1 illustrates a web page 2. This web page 2 includes a comment field embedded by the author within comment tags. A normal html text portion 6 and an image 8 contain text and an image to be displayed. Also embedded within the web page 2 is a script portion 10 which contains executable code, such as Java.

In the example illustrated, the script portion 10 include an embedded suspicious message 12 which includes a known malware author name "Int21". The embedded message 12 also includes a word having a suspicious suffix, i.e. "greetz", which is a common type of slang used by malware authors. The embedded message 12 further includes a word having a suspicious format in form of mix of upper and lower case characters, i.e. "dEAdcOwS". The occurrence of these suspicious target words within the context of a script portion 10 is strongly indicative of the web page 2 containing malware, in this case the script portion 10 is the malware. Thus, even though the script portion 10 may not have previously been encountered and accordingly not identified by an appropriate virus signature, the presence of the embedded message 12 enables it to be detected and identified as potential malware.

It will be appreciated that the comment portion 4 within this example web page could also be used to embed a malware author message. Accordingly, the comment portion of a web page may be regarded as a context within which if target words are identified then this is regarded as suspicious. Conversely, the html text 6 may be include target words quite innocently, e.g. the web page might be authored by an anti-virus system provider and used to describe a particular known item of malware in a manner that happens to include words that would be suspicious in another context.

Figure 2:
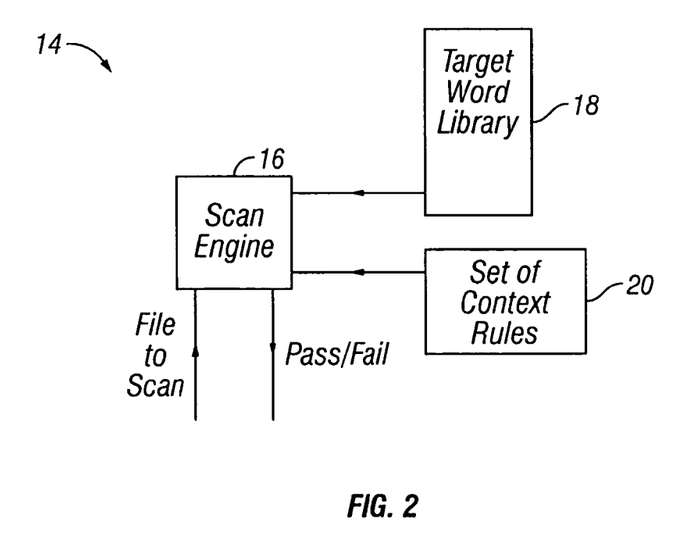
FIG. 2 illustrates a malware scanner that may identify embedded suspicious messages.

FIG. 2 schematically illustrates a malware scanner utilising the current technique. In particular, such a malware scanner 14 may be provided in combination with an operation system (not illustrated). Such an operating system may intercept file access requests and pass these to the malware scanner 14 before they are serviced. Thus, a scan engine 16 may be passed the computer the computer file to be scanned and then seek to generate a pass/fail answer that is issued back to the operating system to control whether or not access to that computer file is permitted. In the context of scanning for embedded messages from malware authors, the scan engine 16 makes reference to a target word library 18 of suspicious words (possibly including phonetic equivalents of suspicious words) together with a set of context rules 20 which may be used to define a number of context within which the occurrence of any of the target words within the target word library 18 would be regarded as suspicious. It will be appreciated that the malware scanner 14 may also include elements (not illustrated) that serve to perform conventional virus signature scanning and heuristic analysis scanning in combination with the malware author message scanning described above.

Figure 3:
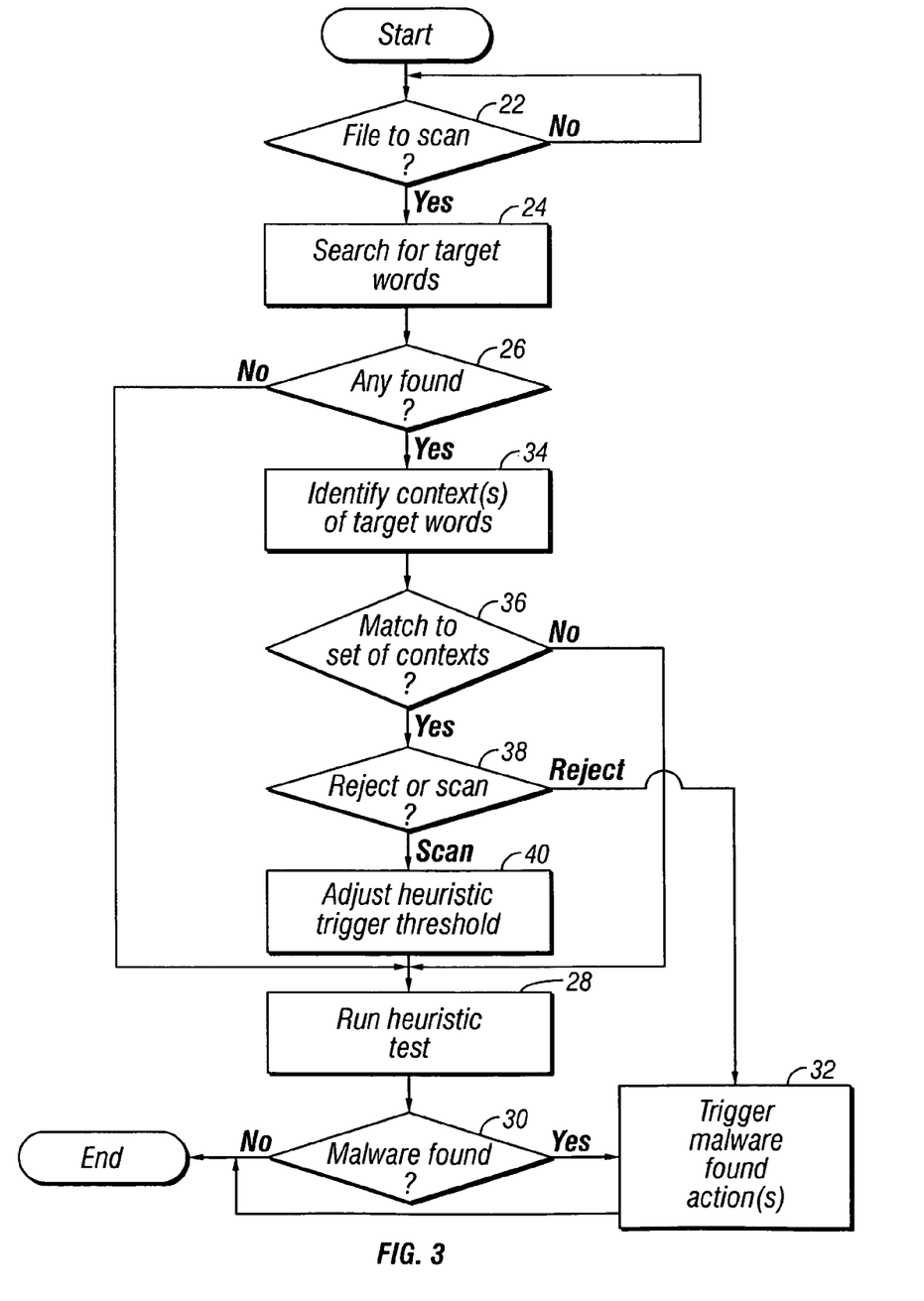
FIG. 3 is a flow diagram schematically illustrating a first scanning technique.

FIG. 3 is a flow diagram schematically illustrating one technique for the malware author message scanning. At step 22 the system waits until it is passed a file to scan. At step 24 the scanner searches through the file it has received to determine whether or not it contains any of the target words within the target word library 18 (including the phonetic equivalents). Step 26 the system determines whether any target words have been found. If no target words have been found, then processing proceeds to step 28 at which a heuristic scan with a low level of sensitivity is run. This low level of sensitivity is chosen to reduce the number of false alarms raised by heuristic scanning. At step 30 a determination is made as to whether or not any malware has been identified by the heuristic scan of step 28. If malware has been identified, then processing proceeds to step 32 at which one or more malware found actions are triggered. These malware found actions can include quarantining the computer file concerned, deleting the computer file concerned, issuing a warning message concerning the computer file, for example to the user, the system administrator or the AV product provider, deleting a portion of the computer file containing the suspected malware or other actions. Either subsequent to the malware actions being triggered, or if no malware is found, the processing determinates. It will be appreciated that rather than completely terminating, the processing may in practice return to step 22 to wait for the next file to scan.

If the test at step 26 indicated that some target words had been found by the search of step 24, then processing proceeds to step 34. Step 34 identifies the context within which the target words were found by using the set of context rules 20. These contexts may include occurrence within a script portion of a web page, occurrence within a comment of a web page, occurrence within executable code (e.g. within an EXE or COM file), occurrence within a predetermined proximity to another target word (e.g. occurrence within two words of another target word) or an occurrence within a certain proximity of a word that might otherwise be regarded as non-suspicious (e.g. "by" followed by what is known to be a malware author pseudonym).

Step 36 identifies whether or not any target words have been found within the predetermined set of contexts known to be suspicious. If no suspicious words have been found within a suspicious context, then processing proceeds to step 28. If one or more suspicious words have been found in one or more suspicious contexts, then processing proceeds to step 38.

Step 38 may determines whether or not the computer file concerned should be directly rejected and the malware found actions of step 32 triggered or whether it is worthwhile performing further scanning to confirm the presence of malware. It may be that for files that are scanned when outbound from a mail server, a strict policy of immediately rejecting and suppressing the outward traffic as adopted. Conversely, inward traffic might be subject to further analysis before being confirmed as malware since the user has a sufficient degree of confidence that the suspect file will not circumvent the other anti malware measures in place.

If the computer file is to be scanned further, then the processing proceeds to step 40 at which an adjustment is made to the heuristic scan trigger (sensitivity/scoring) level. In this way the heuristic scan may be made more sensitive, e.g. by reducing the suspicious activities score required to trigger identification as malware, before heuristic scanning is performed at step 28. In this way computer files identified as suspicious since they contain suspicious messages, may be subject more thorough heuristic scanning or scanning with a lower threshold for file rejection in a manner that seeks to improve the efficiency and degree of protection provided.

Figure 4:
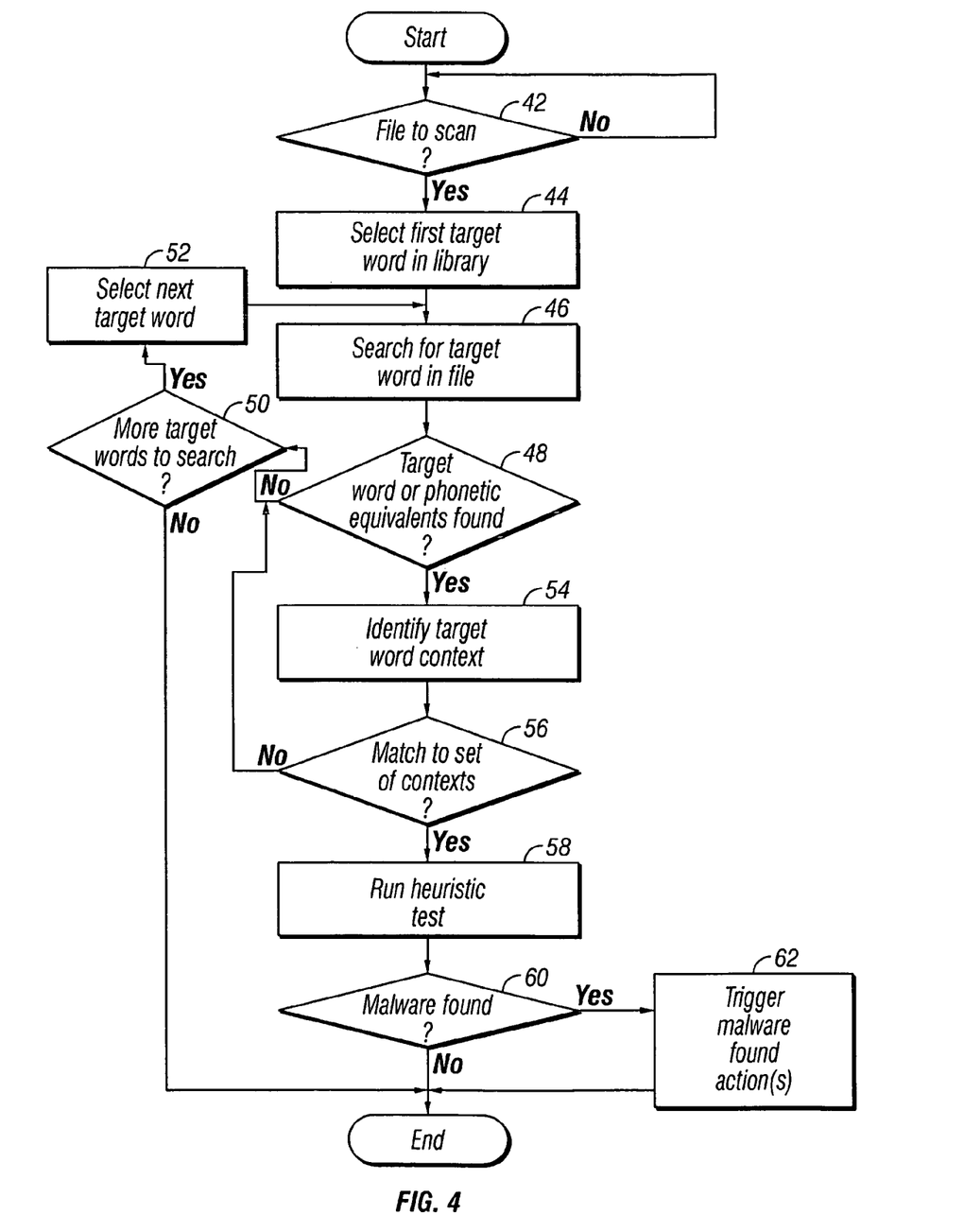
FIG. 4 is a flow diagram schematically illustrating a second scanning technique

FIG. 4 illustrates an alternative embodiment. At step 42 the system waits for a file to scan. When a file has been received, step 44 select the test target word from within the library of target words 18 and a search within a computer file for that target word is made at step 46. The search within the computer file could span the entire computer file or could alternatively focus on particular portions or contexts within the computer file. As an example, if the computer file was a web page, then the comments and the scripts would be searched for target words whereas html text or formatting commands would not be searched.

At step 48 a determination is made as to whether or not the target word or phonetic equivalents of that target word have been found. Malware authors commonly use phonetic spellings as a form of slang. The library of target words 18 may include the correct spelling of a target word together with all of the possible or likely phonetic spellings of that target word. Alternatively, the library of target words 18 may only include the correct spelling and the search algorithm itself generates the phonetic equivalents.

If the target word is not identified, then the processing proceeds to step 50 at which a determination is made as to whether or not the target word library 18 contains more target words for a which a search is to be made. If no such targets words remain to be searched, then the processing terminates, or alternatively returns to step 42 to await the next file to scan. If there are more target words, then step 52 selects the next target word in the library 18 and processing returns to step 46.

If a target word or a phonetic equivalent is found within the computer file as determined by step 48, then processing proceeds to step 54 at which the context rules 20 are applied to determine whether or not that target word has occurred within a suspicious context. It will be appreciated that in this embodiment when a search has been made for each target word individually, it will be more difficult to identify the proximity to other target words, although this functionality may be provided by recording the occurrence of the other target words when they are found in previous passes through the loop and then using these recorded detections when a new target word is encountered. Other suspicious contexts, such as within a script portion, a comment portion or an executable code portion may all readily be determined on a word-by-word basis. Step 56 then determines whether or not a match has been made within the set of context rules, i.e. a suspicious word has been found in suspicious context. If no such match has been found, then processing proceeds to step 50 at which a determination is made as to whether or not there are more target words to search. If a suspicious word has been found in a suspicious context, then processing proceeds to step 58 at which a heuristic test is run against the computer file concerned. It will be seen that in this embodiment the heuristic test 58 is only run when a computer file is first identified as containing a suspicious message. This focuses the resources devoted to heuristic scanning upon those files deemed of highest risk. At step 60 a determination is made as to whether or not the heuristic scan of step 58 has identified malware. If malware has been found, then malware found actions may be triggered at step 62 in a similar way to the previously described step 32 of FIG. 3. Subsequent to any malware found actions being triggered, or if no malware is found, then processing terminates or returns to step 42.

Figure 5:
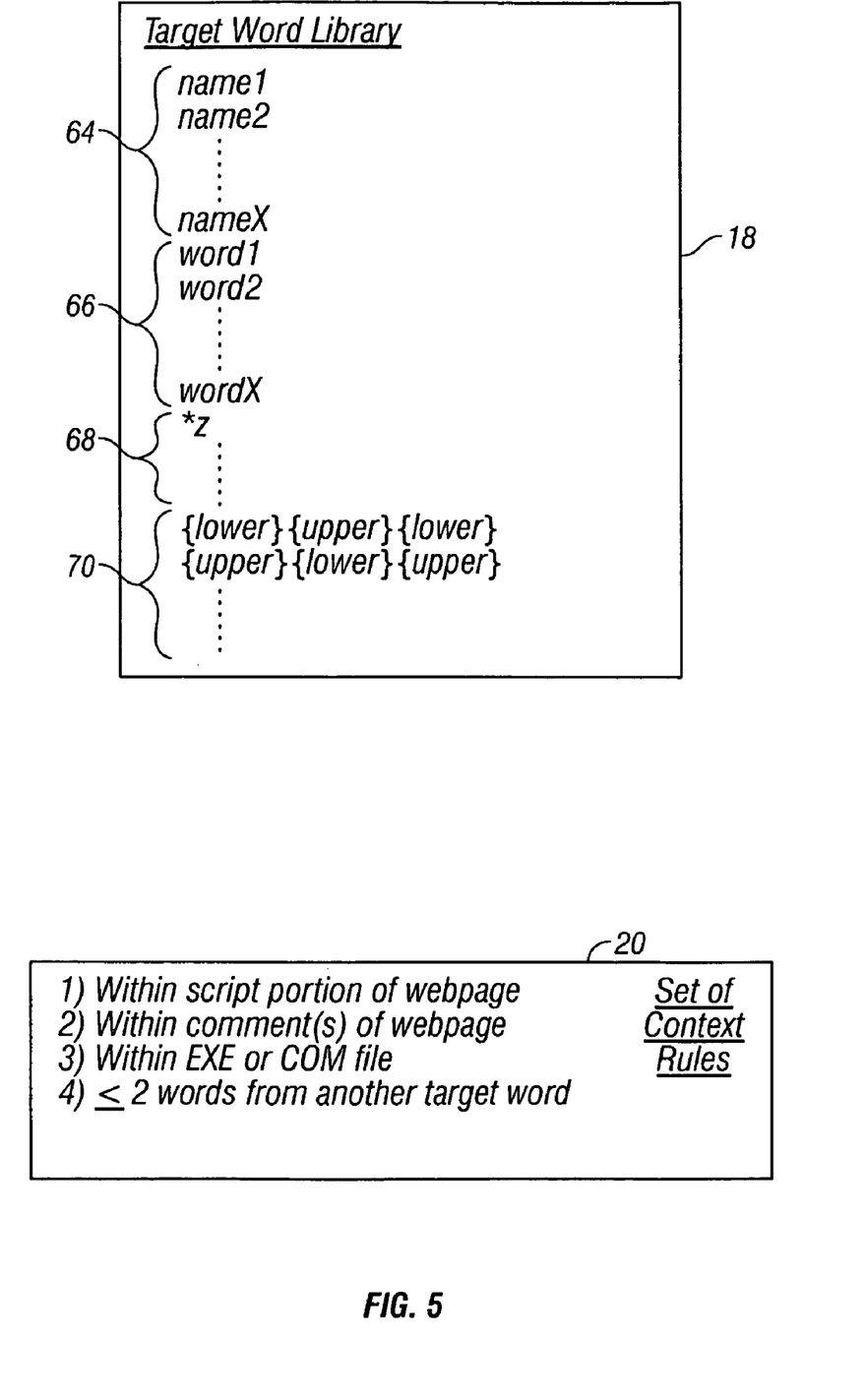
FIG. 5 is a diagram schematically illustrating a target word library and a set of context rules.

FIG. 5 schematically illustrates potential context of a target word library 18 and the set of context rules 20. The target word library 18 contains a plurality of malware author names 64. In a similar way to graffiti writers, malware authors tend to sign their malware using a distinctive pseudonym. The occurrence of such known malware author pseudonyms is highly suspicious, particularly when in a suspicious context. The target word library 18 also includes a collection of words 66 known to be frequently used by malware authors in the messages they embed in their malware and that are also relatively specific to such messages. This list of words 66 may also include phonetic equivalents to those words as desired. A set of words suffix characteristics 68 may also be provided, e.g. words ending in a "z" as such suffix forms are a favourite of malware authors. A set of formatting characteristics for words 70 may also be included within the target word library 18, such as alternating upper and lower case characters within words.

The set of context rules 20 seek to define contexts that may be used by the scan engine 16 to determine whether a suspicious word has occurred within a suspicious context. These rules can take a wide variety of different forms, but particular preferred examples may be ones which define that a suspicious word occurs within a script portion of a web page, within a comment portion of a web page, within an executable file or within a predetermined proximity of other known suspicious words. It will be appreciated that other suspicious contexts may be used.

Figure 6:
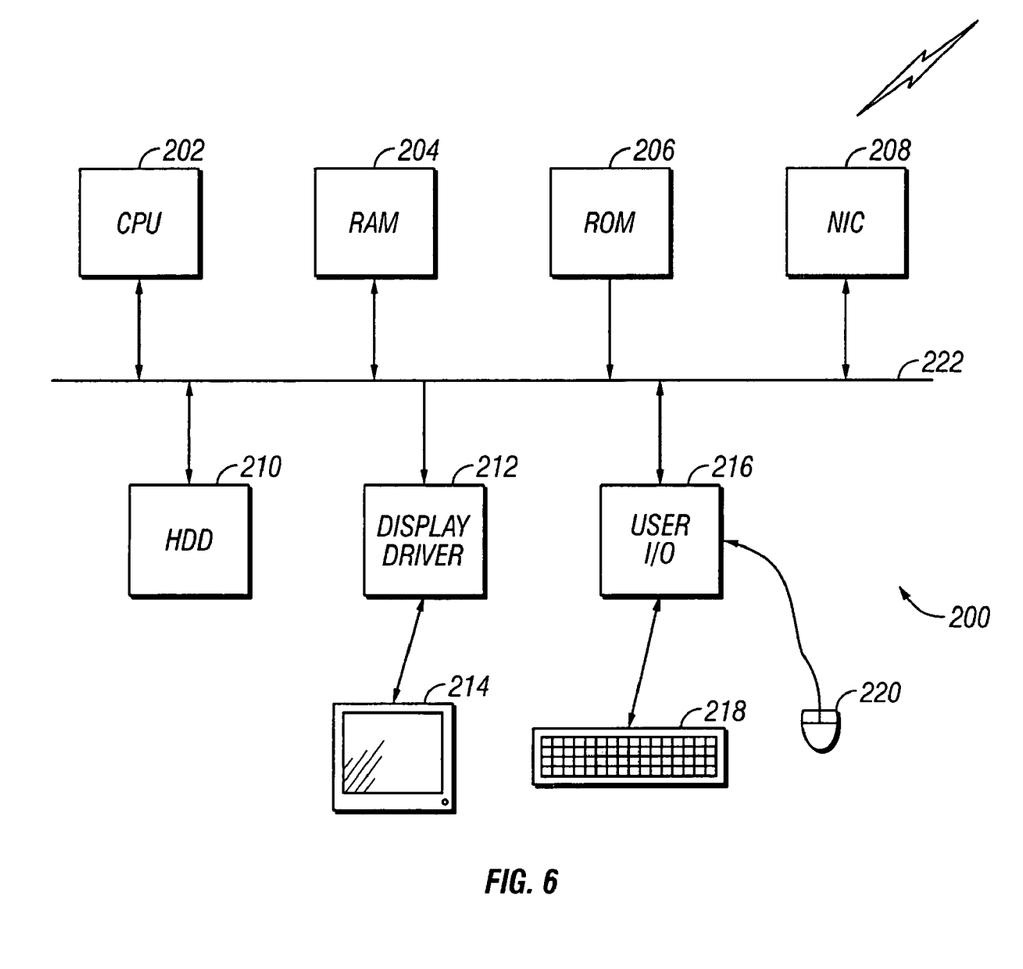
FIG. 6 is a diagram schematically illustrating the architecture of a general purpose computer that may be used to implement the above described techniques.

FIG. 6 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208., The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 6 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a tangible computer readable medium operable for controlling a computer to identify a computer file as potentially containing malware, said computer program product comprising:

searching code operable to search within said computer file for text data containing one or more target words that match at least one of a word or a characteristic of a word within a predetermined word library;

context identifying code operable to identify a context within said computer file of said one or more target words; and file identifying code operable if said context matches one of a predetermined set of contexts to identify said computer file as potentially containing malware;

wherein only those portions of said computer file matching said predetermined set of contexts are searched for said target words;

wherein said computer file includes a web page, such that a comments portion and a scripts portion of said web page which match said predetermined set of contexts are searched for said target words, and a hypertext transfer protocol text portion and a formatting commands portion of said web page which do not match said predetermined set of contexts are not searched for said target words.

2. A computer program product as claimed in claim 1, wherein said predetermined word library includes one or more of:

words that are names associated with known malware authors;

words that are indicative of being part of a message embedded within said computer file by a malware author;

word format characteristics that are indicative of words being part of a message embedded within said computer file by a malware author; and word suffix characteristics that are indicative of words being part of a message embedded within said computer file by a malware author.

3. A computer program product as claimed in claim 1, wherein said predetermined sets of contexts includes one or more of:

within a script portion of the web page;

within a comment of the web page;

within executable code; and within a predetermined proximity to another target word.

4. A computer program product as claimed in claim 1, wherein, if said computer file is identified as potentially containing malware, then malware found code triggers one or more malware found actions.

5. A computer program product as claimed in claim 4, wherein said malware found actions include one or more of:

quarantining said computer file;

deleting said computer file;

issuing a warning message concerning said computer file; and deleting a portion of said computer file suspect of containing malware.

6. A computer program product as claimed in claim 1, wherein, if said computer file is identified as potentially containing malware, then trigger thresholds associated with one or more other malware identifying processes applied to said computer file are adjusted to be more sensitive.

7. A computer program product as claimed in claim 1, wherein if said computer file is identified as potentially containing malware, then a trigger threshold associated with a heuristic malware identifying process applied to said computer file is set to a more sensitive level.

8. A computer program product as claimed in claim 1, wherein said malware comprises one or more of a computer virus, a worm and a Trojan.

9. A method of identifying a computer file as potentially containing malware, said method comprising the step of:

searching within said computer file for text data containing one or more target words that match at least one of a word or a characteristic of a word within a predetermined word library;

identifying a context within said computer file of said one or more target words; and if said context matches one of a predetermined set of contexts, then identifying said computer file as potentially containing malware;

wherein only those portions of said computer file matching said predetermined set of contexts are searched for said target words;

wherein said computer file includes a web page, such that a comments portion and a scripts portion of said web page which match said predetermined set of contexts are searched for said target words, and a hypertext transfer protocol text portion and a formatting commands portion of said web page which do not match said predetermined set of contexts are not searched for said target words.

10. A method as claimed in claim 9, wherein said predetermined word library includes one or more of:
   words that are names associated with known malware authors;
   words that are indicative of being part of a message embedded within said computer file by a malware author;
   word format characteristics that are indicative of words being part of a message embedded within said computer file by a malware author; and
   word suffix characteristics that are indicative of words being part of a message embedded within said computer file by a malware author.

11. A method as claimed in claim 9, wherein said predetermined sets of contexts includes one or more of:
   within a script portion of the web page;
   within a comment of the web page;
   within executable code; and
   within a predetermined proximity to another target word.

12. A method as claimed in claim 9, wherein, if said computer file is identified as potentially containing malware, then one or more malware found actions are triggered.

13. A method as claimed in claim 12, wherein said malware found actions include one or more of:
   quarantining said computer file;
   deleting said computer file;
   issuing a warning message concerning said computer file; and
   deleting a portion of said computer file suspect of containing malware.

14. A method as claimed in claim 9, wherein, if said computer file is identified as potentially containing malware, then trigger thresholds associated with one or more other malware identifying processes applied to said computer file are adjusted to be more sensitive.

15. A method as claimed in claim 9, wherein if said computer file is identified as potentially containing malware, then a trigger threshold associated with a heuristic malware identifying process applied to said computer file is set to a more sensitive level.

16. Apparatus including a tangible computer readable medium, for identifying a computer file as potentially containing malware, said apparatus comprising:
   searching logic operable to search within said computer file for text data containing one or more target words that match at least one of a word or a characteristic of a word within a predetermined word library;
   context identifying logic operable to identify a context within said computer file of said one or more target words; and
   file identifying logic operable if said context matches one of a predetermined set of contexts to identify said computer file as potentially containing malware;
   wherein only those portions of said computer file matching said predetermined set of contexts are searched for said target words;
   wherein said computer file includes a web page, such that a comments portion and a scripts portion of said web page which match said predetermined set of contexts are searched for said target words, and a hypertext transfer protocol text portion and a formatting commands portion of said web page which do not match said predetermined set of contexts are not searched for said target words.

17. A computer program product as claimed in claim 1, wherein said predetermined sets of contexts includes a script portion of a webpage.

18. A computer program product as claimed in claim 1, wherein said predetermined sets of contexts includes a comment of a webpage.

19. A computer program product as claimed in claim 1, wherein said predetermined sets of contexts includes executable code.

20. A computer program product as claimed in claim 1, wherein said predetermined sets of contexts includes a predetermined proximity to another target word.

21. A computer program product as claimed in claim 1, wherein said predetermined sets of contexts includes:
   within a script portion of a webpage;
   within a comment of a webpage;
   within executable code; and
   within a predetermined proximity to another target word.

* * * * *